United States Patent [19]

Somers

[11] 3,802,551
[45] Apr. 9, 1974

[54] FLEXIBLE TUBULAR CONVEYOR

[76] Inventor: S. Brice L. Somers, 5 quai du Mont-Blanc, Geneva, Switzerland

[22] Filed: Feb. 16, 1972

[21] Appl. No.: 226,784

[30] Foreign Application Priority Data
Feb. 17, 1971 Switzerland.......................... 2263/71

[52] U.S. Cl. .............................................. 198/213
[51] Int. Cl. ............................................. B65g 33/16
[58] Field of Search ............................. 198/213–217

[56] References Cited
UNITED STATES PATENTS

| | | | |
|---|---|---|---|
| 1,412,285 | 4/1922 | James .................................. 302/11 |
| 3,360,108 | 12/1967 | Voss ..................................... 198/213 |
| 847,961 | 3/1907 | De la Mar............................ 198/213 X |
| 2,798,444 | 7/1957 | Meakin................................ 198/213 X |
| 2,760,624 | 8/1956 | Compton ............................ 198/213 |
| 1,748,206 | 2/1930 | Christian............................. 198/213 X |
| 2,954,261 | 9/1960 | Taupin ................................. 198/213 X |
| 1,053,645 | 2/1913 | Reimer ................................ 198/213 X |
| 2,437,259 | 3/1948 | Kautz .................................. 198/213 UX |

FOREIGN PATENTS OR APPLICATIONS

| | | | |
|---|---|---|---|
| 6,513,121 | 4/1967 | Netherlands........................ 198/213 |
| 689,181 | 1/1930 | France................................. 198/213 |

Primary Examiner—Evon C. Blunk
Assistant Examiner—W. Scott Carson
Attorney, Agent, or Firm—Young & Thompson

[57] ABSTRACT

A flexible tubular conveyor comprises an outer flexible conduit with a coreless helical screw formed by a plurality of interengaging blade-like elements. A rotary driving member angularly secured to the periphery of the screw-forming elements is formed by a helical spring simultaneously acting to reinforce the screw, the pitch of which may vary along the conduit by elastic deformation due to the load stresses.

3 Claims, 14 Drawing Figures

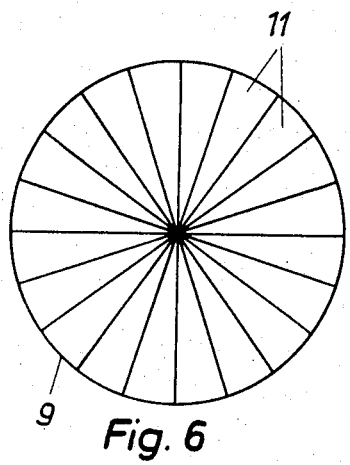
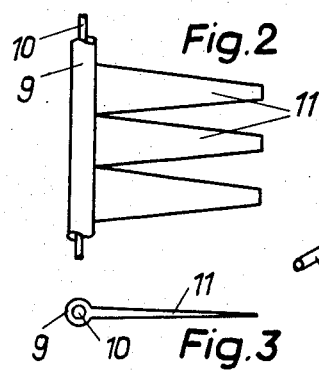
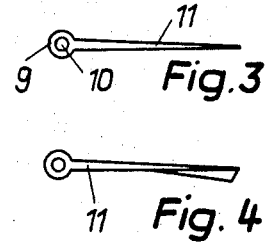
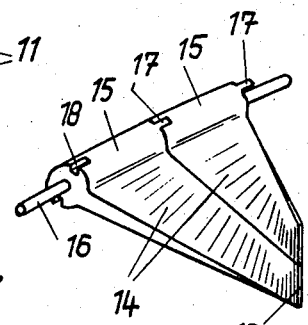
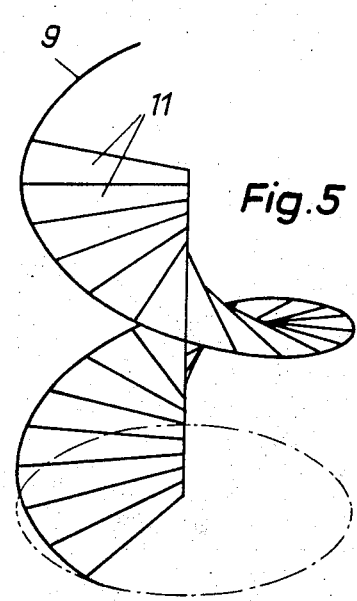
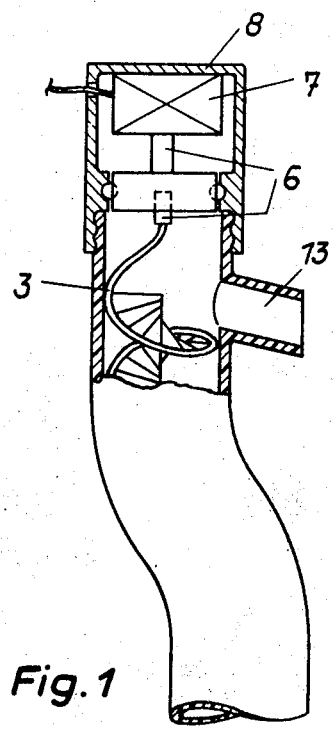
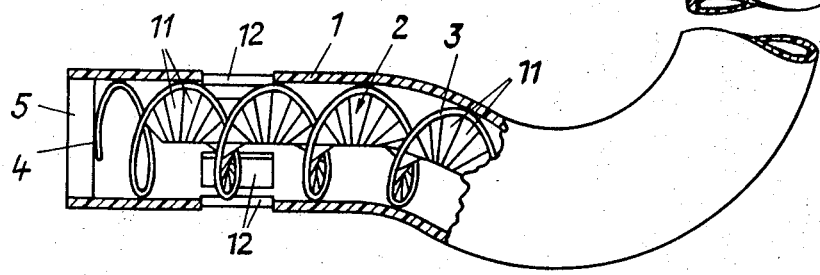

FLEXIBLE TUBULAR CONVEYOR

The invention relates to flexible tubular conveyor devices for transporting granular and powdery products or even fluids over short distances, for example with a level difference of several metres, such as for filling wagons from a silo.

Some known devices of this type are pneumatic, but have inherent drawbacks such as the presence of filters which must often be cleaned. Moreover, these devices have the drawback of separating powders from grains mixed therewith, and also tend to separate grains according to their grade.

Conveyor devices comprising a flexible tubular conduit inside which is arranged rotary propeller means for moving the products along the conduit are also known.

A device of the latter type is described in U.S. Pat. No. 3,381,801. The propeller means of this device comprise a fixed flexible central core on which is mounted a helical part rotated by means of a motor. The helical part is formed by a helicoidal spring having only a rather small surface available for driving the product. There is also a considerable space between the spring and the inner wall of the conduit, so that the overall efficiency of this device is low. Moreover, the device cannot be used to transport liquids.

Published Dutch Patent application No. 6,513,121 discloses a conveyor device comprising, in an outer flexible tube, a flexible propeller means formed by a single helicoidal piece forming an Archimedes screw, a helical spring being embedded in the outer part of the screw and is thereby integrally secured with the latter. The spring is rotatably driven by means of a motor. The Archimedes screw is carried by a central core which makes the single-piece screw longitudinally rigid and unable to undergo a modification of its pitch along the length of the screw. This leads to the drawback that upon starting up, the product to be transported exerts a considerable force on the screw, which may break under the effort. Such a breakage would necessitate replacement of the whole screw.

U.S. Pat. No. 1,412,285 describes a conveyor device comprising, in an outer flexible tube, flexible propeller means being formed by a single-piece Archimedes screw without a central core and rotatably driven by means of a motor. The screw can deform during starting up and adopt a variable pitch along its length, smaller at one end and greater at the other. The screw does not include a reinforcing spring and if it breaks, it must be replaced. If such a device were to be used for the transport of heavy products with a high output, it would not be possible to make it in a plastics material.

In French Pat. No. 1,300,230 there is disclosed a conveyor device with propeller means formed by a flexible central core on which are mounted blades forming an Archimedes screw. This central core makes the propeller means longitudinally rigid and non-deformable under effort, which leads to a risk of breakage if the screw is not made of a very strong material such as a metal.

A heat exchanger device described in French Pat. No. 1,100,505 comprises a propeller means formed by a central core in which are fixed hollow helicoidal elements allowing the passage of a cooling fluid. The assembly is rigid and non-deformable and, moreover, would normally be in metal to ensure the exchange of heat between the fluid and the transported product. Consequently, this heat exchanger does not form a flexible conveyor device which can transport a product along a variable curved path.

The present invention aims to provide a flexible tubular conveyor device conceived such that the above-mentioned disadvantages of the known devices can be avoided.

According to the invention, a flexible tubular conveyor device for granular, powdery and fluid products comprises a flexible tubular conduit and rotary flexible propeller means in the conduit for moving a product along the conduit, characterised in that said flexible propeller means comprises a rotary member forming a helicoidal spring, and at least one element forming at least one coreless screw angularly fixed to the rotary member and extending radially in the conduit, motor means being provided for rotatably driving the rotary member and, with it, the screw forming element or elements.

In this conveyor, under the effort exerted by the product to be transported, especially during starting up, the propeller means can elastically deform and temporarily allow a variable pitch along the length of the screw, which eliminates the risk of breakage, since the screw is reinforced by the spring. When the screw comprises several elements and should one of these elements break, it can easily be replaced by a new element without the need to change the entire screw. Apart from this, the screw can still operate even if one or several of these elements should break. Since the screw has no central core, it is more flexible than a screw with a core and can be used in an outer tubular conduit with a lesser curvature. Finally, the working surface of the coreless screw available for driving the product is the maximum for an outer tubular conduit with a given diameter.

This conveyor is conceived to operate with a high mechanical efficiency and, apart from granular and powdery products, can also be used for the transport of liquids.

Several embodiments of the invention will now be described, by way of example, with reference to the accompanying schematic drawings, in which:

FIG. 1 is an elevational view, partly in cross-section, of a first embodiment;

FIG. 2 is an elevational view of a portion of the rotary propeller device of FIG. 1, at a first stage of its manufacture;

FIG. 3 is a plan view corresponding to FIG. 2;

FIG. 4 is a view similar to FIG. 3, but at a later stage of manufacture;

FIG. 5 is a schematic perspective view showing a portion of the length of the rotary propeller device in the working position;

FIG. 6 is a plan view corresponding to FIG. 5;

FIG. 7 is a perspective view of part of a varied form of the rotary propeller for the embodiment shown in FIG. 1;

Figure 9:
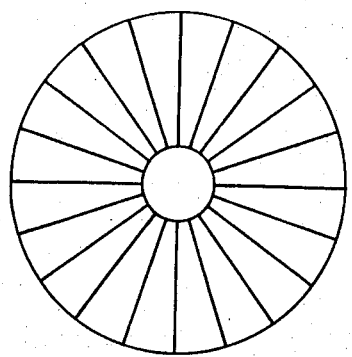
FIG. 9 is a plan view corresponding to FIG. 8.

The device shown in FIGS. 1 to 4 comprises a flexible tubular conduit 1 which may for example be in plastics material such as nylon, or in metal. Inside this conduit is disposed a flexible rotary propeller 2 which is formed on the one hand by a rotary flexible member 3 forming a helicoidal spring coaxial to and in the immediate proximity of the inner wall of the conduit 1. One of the ends 4 of the member 3 faces a part 5 blocking one of the ends of the conduit 1; in practice, this is the lower end of the conveyor device. The other end of the rotary member 3 is fixed to a shaft 6 of an electric motor 7 disposed, in this example, in a casing 8 at the upper end of the conveyor device.

The member 3 also comprises a body 9 in plastics material or metal moulded or fixed about a metallic wire 10, as can be seen on FIGS. 2 and 3, which show this rotary member at the beginning if its manufacture, before it is given the helicoidal shape shown in FIG. 1.

Figure 8:
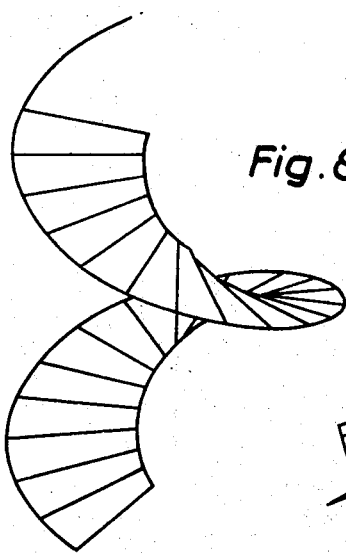
FIG. 8 is a view similar to FIG. 5 of a rotary propeller of a second embodiment.

The flexible rotary propeller additionally comprises a series of wings 11 of a generally trapezoidal shape, as is shown of FIG. 2. These wings are joined by their large bases to the body 9 with which they are made in one piece, or in sections, by moulding, the long bases of successive elements being arranged end-to-end. During manufacture of the propeller, the wings 11 are made to assume a warping, as is seen on FIG. 4, and the body 9 with its metallic wire 10 are formed to take a helicoidal shape and form a helicoidal spring. Because of the helical winding of the body 9 and wire 10, the wings 11 have their free inner ends brought towards the free ends of the adjacent wings. The shape and the degree of warping of the wings 11 is such that when the screw is formed with the desired diameter, the wings 11 form jointed helicoidal blades which together form, as is seen on FIGS. 1 and 5, a continuous screw. It will be noted that in the example shown, the blade forming wings 11 extend to the axis of the device. The free ends of the blades moreover coincide with this axis. In practice, it would be possible to provide not a geometrically perfect juxtaposition of the wings 11, but a slight overlap of the adjacent blades one upon the other in the manner of roofing slates. It would also be possible for these blades not to extend exactly up to the axis of the device, but to stop at a short distance from this axis, as shown on FIGS. 8 and 9.

FIG. 6 shows in plan the screw formed by the assembly of the different blades. In the variant according to FIGS. 8 and 9 the blades do not extend up to the axis so that a small circular opening is left at the centre of the screw.

The tubular conduit 1 has, in the vicinity of its lower end, lateral inlet openings 12 and, in the vicinity of its upper end, a lateral outlet pipe 13. In operation, the lower end of the device is dipped into a granular or powdery product or fluid that is to be transported to a higher level, and the outlet pipe 13 is located at the desired location for delivery of the product. The lower end of the conduit 1 could alternatively be located in a recipient placed below a feed hopper. The motor 7 is made to rotate and drives the rotary member 3 and, with it, the the screw formed by the assembly of blades 11. The direction of rotation chosen is such that the screw acts in the manner of an Archimedes screw to drive the product in the conduit 1 up to the upper part thereof from where it is delivered b the lateral outlet pipe 13. If, for any reason by the motor 7 stops, the conveyor screw also stops but the mass of granular or powdery product in the conduit 1 remains practically still, that is it does not fall back down to the base of the conveyor device. This is very important since in this manner when the motor is started up again, one avoids the product accumulated at the lower end of the device forming a considerable overload of the propeller member in this region, whilst the upper part of the propeller would turn empty. Such an unequally supported overload implies risks of rupturing the screw. Here, the load remains uniform all along the screw and since, in addition, the outer helicoidal surface of the screw has only a minimum play in the conduit 1, a high mechanical efficiency is ensured.

The propeller member could be directly moulded to the helicoidal shape shown on FIGS. 1 and 5, which would avoid the formation of wings 11 and the operation of bending the body 9 and warping the wings 11. A continuous screw, no longer with distinct contiguous blades, would thus be formed.

In the variant according to FIG. 7, the propeller member is formed of a succession of identical blades 14 each integral at their outer end with a substantially cylindrical body 15. The bodies 15 are threaded on a metallic wire 16 and each have teeth 17 and corresponding notches 18 adapted to interfit, as shown in FIG. 7, to ensure an accurate juxtapositioning of the blades 14. When all of the blades are thus slipped in place, the bodies 15 are preferably welded, for example by ultrasonic means, to the wire 16. The warped helicoidal shape of the blades 14 can be seen on FIG. 7; these blades are each made in one piece by moulding their outer end with the body 15 whilst their inner end 19, coinciding with the axis of the device, is turned by an angle somewhat less than 90° in relation to the longitudinal direction of the body 15.

The above examples relate to simple, i.e. single, screws. One could also envisage double and triple screws, that is an assembly of screws of the same dimensions, in the manner of a multiple threaded screw. These different screws would be fixed together at each end of the device.

Of course, the parts 9 and 15; 11 and 14 respectively may not be in plastics material, but for example in a metal such as stainless steel.

Figure 11:
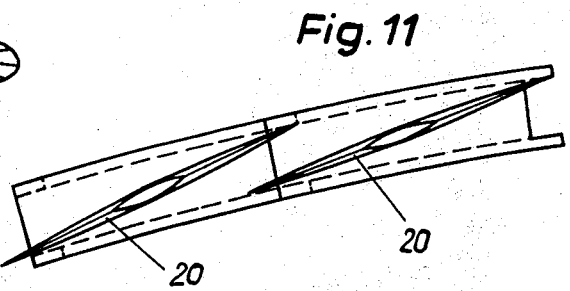
FIG. 11 is a side view corresponding to FIG. 10.
Figure 10:
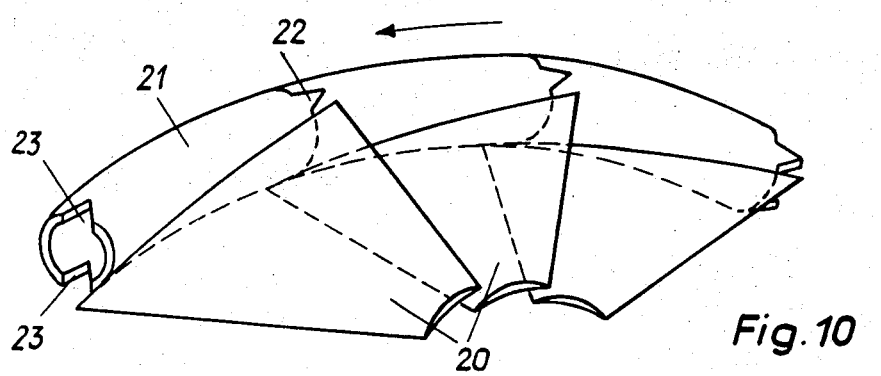
FIG. 10 is a partial perspective view of a variant of the propeller according to FIG. 8.

In the embodiment according to FIGS. 10 and 11, the blades 20 of the conveyor screw are no longer jointed; they form the parts of several screws. Each blade 20 is fixed to a tubular body 21, which bodies 21 interfit in one another by means of teeth 22 and cooperating notches 23. These tubular bodies 21 are threaded on a helicoidal metallic support or wire, not shown, as in the example according to FIG. 7.

Figure 12:
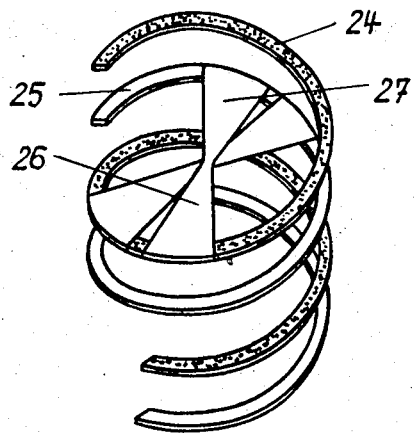
FIG. 12 is a schematic perspective view of the propeller of a third embodiment.

The embodiment of conveyor according to FIG. 12 comprises two identical coaxial, but longitudinally separated, helicoidal springs 24, 25. The blades are double, that is they comprise two symmetrical parts 26, 27 fixed together and fixed by their outer parts, one to the spring 24 and the other to the spring 25. The two parts 26, 27 form two distinct screws and the two springs are connected together by the blades of the screws.

To simplify FIG. 12, only one pair of these double blades is shown.

In a variant of the above embodiments, the driving motor could be disposed at the lower end of the device.

Figure 13:
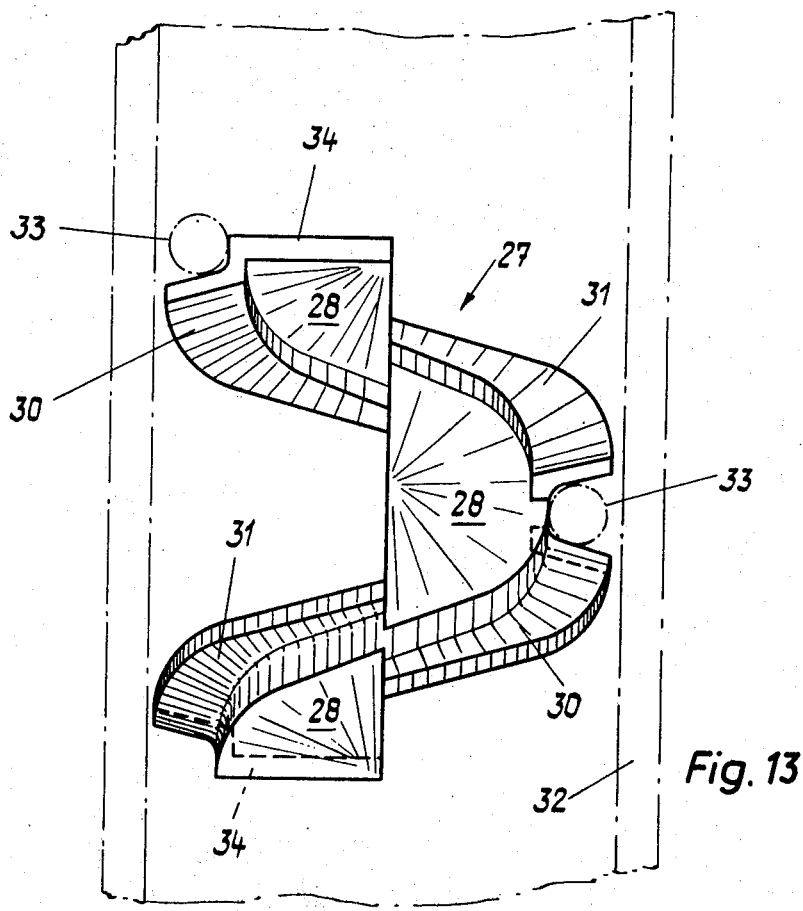
FIG. 13 is a view of a part used in a fourth embodiment.
Figure 14:
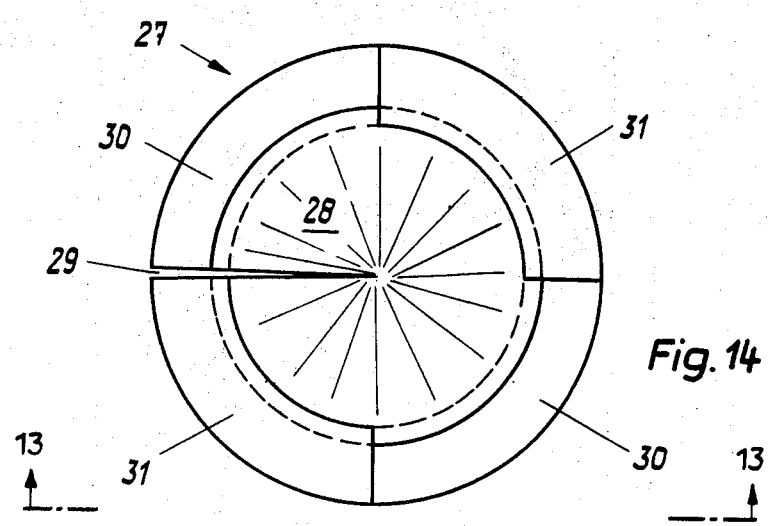
FIG. 14 is a plan view corresponding to FIG. 13.

FIGS. 13 and 14 show an injection moulded part 27 adapted to be assembled with similar parts to constitute the screw forming element of the flexible propeller means of a fourth embodiment. The part 27 comprises a helicoidal ramp 28 which turns through a screw angle which can be at most 360° less a small angular play 29 necessary for removal from the mould. The helicoidal ramp 28 carries helicoidal wings 30 and 31, made by moulding, directed towards the exterior of the ramp 28 in a manner to come into the proximity of the internal surface of a flexible tubular conduit 32. The wings 30 and 31 are disposed alternately on either side of the ramp 28. In the example shown, the part 27 comprises two wings 30 and two wings 31, but it could comprise a greater number, or only one of each, for example.

The part 27 is threaded on a helicoidal spring 33, for example in steel, a section of which is shown in FIG. 13, this spring forming the rotary driving member and being disposed at the level of the surface of the ramp 28. The spring 33 passes alternately between the wings 30 and the wings 31 and bears against the outer face of the ramp 28 when it turns, so that the part 27 is angularly fixed to the spring and turns with it. A series of parts 27 are successively threaded on the spring 33 in a manner to touch by their end faces 34 to form a continuous flexible screw.

The part 27 can be moulded by means of two punches in a mould and which respectively define between them the upper surface of the ramp 28 and the wing 30 and the lower face of the ramp 28 and the wing 31. Removal from the mould takes place simply by separating the punches from the mould, by movement in an axial direction. It is clear that the part can only at the most form an angle totalling 360° less a small angular play such as the play 29 which is necessary to permit the assembly and the separation of the punches and the mould.

In a variant, the parts such as the part 27 could be extruded and form a screw angle of more than one complete turn; it would even be possible to provide a continuous flexible screw with a series of wings alternately disposed about its periphery from a single extruded part.

The described devices have the advantage of comprising flexible propeller means capable of deformation under stresses due to a load, especially upon starting up, so that the screw can assume a variable pitch along its length without danger of breakage. When the screw comprises several elements assembled together, if one or more elements have to be changed due to breakage or wear, it suffices to remove the element or elements to be changed and replace a new element or elements at the end of the spiral spring. The elements are then slid along to come into contact with one another to reconstitute the screw. It may moreover be noted that breakage of an element does not preclude operation of the device.

What is claimed is:

1. A flexible tubular conveyor comprising a flexible tubular conduit and flexible rotary propeller means in the conduit for moving material along the conduit, said flexible propeller means comprising a rotary member forming a helicoidal spring, and a plurality of elements forming at least one coreless screw in fixed angular relationship to the rotary member and extending radially in the conduit, said rotary member being disposed in outer parts of the screw-forming elements, said screw-forming elements being movable relative to each other upon flexure of said rotary member, and motor means for rotatably driving the rotary member and with it the screw-forming elements, said at least one screw forming element being formed by at least one part comprising a helicoidal ramp and helicoidal wings formed with the ramp at the periphery thereof alternately on either side of the ramp surface, the rotary member passing in driving contact about the periphery of the ramp between said helicoidal wings.

2. A flexible tubular conveyor comprising a flexible tubular conduit and flexible rotary propeller means in the conduit for moving material along the conduit, said flexible propeller means comprising a rotary member forming a helicoidal spring, and a plurality of elements forming at least one coreless screw in fixed angular relationship to the rotary member and extending radially in the conduit, said rotary member being disposed in outer parts of the screw-forming elements, said screw-forming elements being movable relative to each other upon flexure of said rotary member, and motor means for rotatably driving the rotary member and with it the screw-forming elements, said screw forming elements being formed by pairs of blades, the blades of each pair being fixed together by their inner ends and being fixed by their outer ends to two distinct helicoidal rotary members which are thus connected together by the blades.

3. A flexible tubular conveyor comprising a flexible tubular conduit and flexible rotary propeller means in the conduit for moving material along the conduit, said flexible propeller means comprising a rotary member forming a helicoidal spring, and a plurality of relatively short separable elements forming at least one coreless screw in fixed angular relationship to the rotary member and extending radially in the conduit, said rotary member being disposed in outer parts of the screw-forming elements, said screw-forming elements being movable relative to each other upon flexure of said rotary member, and motor means for rotatably driving the rotary member and with it the screw-forming elements, said screw-forming elements having helical track surfaces thereon of the same pitch as said rotary member on which said screw-forming elements freely slide relative to each other along said rotary member and when slid into contact with each other comprising a substantially continuous helicoidal ramp, said helical track surfaces at least partially surrounding said rotary member.

* * * * *